(12) United States Patent
Frolov

(10) Patent No.: US 10,549,364 B2
(45) Date of Patent: Feb. 4, 2020

(54) TABLE SAW HAVING A DUAL POWER TRAIN ASSEMBLY

(71) Applicants: Robert Bosch Tool Corporation, Broadview, IL (US); Robert Bosch GmbH, Stuttgart (DE)

(72) Inventor: Andrew Frolov, Glenview, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 88 days.

(21) Appl. No.: 15/898,962

(22) Filed: Feb. 19, 2018

(65) Prior Publication Data

US 2019/0255634 A1    Aug. 22, 2019

(51) Int. Cl.
| | |
|---|---|
| *B23D 47/12* | (2006.01) |
| *B23D 45/04* | (2006.01) |
| *B23D 45/06* | (2006.01) |
| *B27B 25/10* | (2006.01) |

(52) U.S. Cl.
CPC ......... *B23D 47/123* (2013.01); *B23D 45/044* (2013.01); *B23D 45/06* (2013.01); *B27B 25/10* (2013.01)

(58) Field of Classification Search
CPC ...... B23D 45/06; B23D 47/026; B23D 47/12; B23D 47/123; B23D 45/048; B23D 47/126; B23D 47/005; B23D 45/044; B27G 19/02; B27B 5/29; B27B 5/165; Y10T 83/773; Y10T 83/7722; Y10T 83/7697; Y10T 83/613; Y10T 83/828; Y10T 83/7734; Y10T 83/899; Y10T 83/148; Y10T 83/089; Y10T 83/159
USPC ..... 83/477.2, 477, 54, 185, 591, 490, 471.3, 83/522.11, 648, 62.1, 76, 74, 665, 666, 83/626, 468.3, 471.1, 663; 173/216, 213, 173/217; 30/376, 388; 144/48.2, 48.3, 144/48.6
See application file for complete search history.

(56) References Cited

U.S. PATENT DOCUMENTS

| | | | | |
|---|---|---|---|---|
| 3,036,608 A | * | 5/1962 | Weber | B23D 57/0092 144/285 |
| 3,285,303 A | * | 11/1966 | Kwiatkowski | B23D 47/025 83/477.1 |
| 5,189,937 A | * | 3/1993 | Garuglieri | B23D 45/048 83/471.3 |

(Continued)

*Primary Examiner* — Ghassem Alie
(74) *Attorney, Agent, or Firm* — Maginot, Moore & Beck LLP

(57) ABSTRACT

A table saw includes a base assembly, a table assembly supported by the base assembly, and a saw assembly supported by the base assembly. The saw assembly has a motor having a motor output shaft and a power train assembly. The motor is configured to rotate the motor output shaft at a first rotational speed. The power train assembly includes an intermediate shaft, a first gear stage, an arbor shaft, and a second gear stage. The first gear stage is configured to transmit rotation of the motor output shaft at the first rotational speed to rotation of the intermediate shaft at a second rotational speed, which is less than the first rotational speed. The second gear stage is configured to transmit rotation of the intermediate shaft at the second rotational speed to rotation of the arbor shaft at a third rotational speed, which is greater than the second rotational speed.

17 Claims, 3 Drawing Sheets

(56) References Cited

U.S. PATENT DOCUMENTS

| | | | |
|---|---|---|---|
| 5,425,294 A * | 6/1995 | Ushiwata | B23D 45/044 |
| | | | 83/468.3 |
| 5,720,213 A | 2/1998 | Sberveglieri | |
| 5,819,625 A | 10/1998 | Sberveglieri | |
| 6,295,910 B1 * | 10/2001 | Childs | B23D 47/12 |
| | | | 192/150 |
| 7,634,958 B2 * | 12/2009 | Baugher | B26D 1/16 |
| | | | 83/478 |
| 7,752,951 B2 * | 7/2010 | Ouellette | B27B 5/165 |
| | | | 144/48.3 |
| 8,695,224 B2 * | 4/2014 | Gehret | B23D 47/12 |
| | | | 30/388 |
| 9,352,403 B2 * | 5/2016 | Frolov | B23D 45/06 |
| 2008/0257126 A1 | 10/2008 | Bauer | |
| 2009/0260498 A1 * | 10/2009 | Imamura | B23D 45/048 |
| | | | 83/663 |
| 2016/0303667 A1 | 10/2016 | Marinov | |

* cited by examiner

TABLE SAW HAVING A DUAL POWER TRAIN ASSEMBLY

TECHNICAL FIELD

This disclosure relates to table saws, and particularly drive systems for driving the cutting blade of a table saw.

BACKGROUND

Table mounted cutting tools, such as table saws, are valuable tools used for a variety of tasks, such as cross-cutting wood, and ripping large boards or panels into narrow strips. While there are a variety of table saw designs, most table saws include a base housing structure that supports a table top and a cutting assembly positioned below the table top. The table top has a substantially planar upper surface upon which workpieces may be supported.

The cutting assembly includes a circular saw blade that is mounted on an arbor with a portion of the blade extending upwardly through an opening defined in the table top. The cutting assembly also includes a motor with power train for rotating the arbor so that the cutting blade may be driven to perform cutting operations on workpieces supported on the table top. As the motor drives the cutting blade to rotate, a workpiece may be moved across the table top against the blade to allow the blade cut the workpiece.

Motors in table saws typically rotate at a speed that is greater than the speed at which a saw blade can be driven. For instance, a table saw motor may rotate at a speed of between 24,000 and 30,000 RPM, while the saw blade may have an output speed of between 3,500 and 5,000 RPM. Thus, the table saws typically include a power train between the motor output shaft and the saw blade output shaft that reduces the speed.

In a conventional table saw power train, a single stage gear reduction is used to reduce the motor speed to the output shaft speed. A pinion gear fixed to the motor output shaft rotates a driven gear that is fixed to the saw blade output shaft, or arbor shaft. In order to reduce the speed by the required amount, the size of the driven gear must have a considerably larger number of gear teeth than the motor pinion gear. As a result, the driven gear has a relatively large diameter.

The large driven gear, and the housing that encloses it, therefore occupy space above the central axis of the arbor shaft. As a result, the large driven gear limits the uppermost position at which the saw can be positioned. A table saw that has a smaller driven gear on the saw output or arbor shaft would therefore be desirable.

SUMMARY

In a first embodiment, a table saw comprises a base assembly, a table assembly supported by the base assembly, and a saw assembly supported by the base assembly. The saw assembly comprises a motor having a motor output shaft and a power train assembly. The motor is configured to rotate the motor output shaft at a first rotational speed. The power train assembly comprises an intermediate shaft, a first gear stage, an arbor shaft, and a second gear stage. The first gear stage is configured to transmit rotation of the motor output shaft at the first rotational speed to rotation of the intermediate shaft at a second rotational speed, which is less than the first rotational speed. The second gear stage is configured to transmit rotation of the intermediate shaft at the second rotational speed to rotation of the arbor shaft at a third rotational speed, which is greater than the second rotational speed.

In another embodiment of the table saw, the first gear stage further comprises a motor pinion gear fixedly attached to the motor output shaft and a first stage driven gear fixedly attached to the intermediate shaft. The first stage driven gear meshes with the motor pinion gear such that rotation of the motor pinion gear at the first rotational speed causes rotation of the first stage driven gear at the second rotational speed.

In a further embodiment, the second gear stage further comprises a second stage driving gear fixedly attached to the intermediate shaft and a second stage driven gear fixedly attached to the arbor shaft. The second stage driven gear meshes with the second stage driving gear such that rotation of the second stage driving gear at the second rotational speed causes rotation of the second stage driven gear at the third rotational speed.

In some embodiments, the saw assembly further comprises a fastening mechanism configured to fix a saw blade to the arbor shaft.

In another embodiment, the fastening mechanism comprises a first flange washer configured to clamp against a first side of the saw blade and a second flange washer configured to clamp against a second side of the saw blade.

In yet another embodiment of the table saw, the first flange washer has a first outer diameter, the second flange washer has a second outer diameter, and the second stage driven gear has a third outer diameter. The third outer diameter is less than at least one of the first outer diameter and the second outer diameter.

In some embodiments of the table saw, the power train assembly further comprises a power train housing in which the first and second gear stages are enclosed. The power train housing has an upper extent that is spaced apart from a central axis of the arbor shaft by a first distance that is less than a second distance by which an outer extent of at least one of the first and second flange washers is spaced apart from the central axis.

In one embodiment, the base assembly includes an adjustment mechanism operably connected to the saw assembly and configured to raise and lower the saw assembly relative to the table assembly.

In a further embodiment of the table saw, the table assembly comprises a table top and a throat plate defining a throat opening through which the saw blade extends. The adjustment mechanism is further configured to rotate the saw assembly relative to the table top, and, when a cutting plane of the saw assembly is at an angle of 45 degrees relative to the table top, one of the first and second flange washers extends at least partially into the throat opening.

In still another embodiment, the motor output shaft, the intermediate shaft, and the arbor shaft are substantially parallel to one another.

In another embodiment, a saw assembly for a table saw comprises a power train assembly and a motor having a motor output shaft. The motor is configured to rotate the motor output shaft at a first rotational speed. The power train assembly includes an intermediate shaft, a first gear stage, and arbor shaft, and a second gear stage. The first gear stage is configured to transmit rotation of the motor output shaft at the first rotational speed to rotation of the intermediate shaft at a second rotational speed, which is less than the first rotational speed. The second gear stage is configured to transmit rotation of the intermediate shaft at the second rotational speed to rotation of the arbor shaft at a third rotational speed, which is greater than the second rotational speed.

In a further embodiment of the saw assembly, the first gear stage further comprises a motor pinion gear fixedly attached to the motor output shaft and a first stage driven gear fixedly attached to the intermediate shaft. The first stage driven gear meshes with the motor pinion gear such that rotation of the motor pinion gear at the first rotational speed causes rotation of the first stage driven gear at the second rotational speed.

In another embodiment, the second gear stage further comprises a second stage driving gear fixedly attached to the intermediate shaft and a second stage driven gear fixedly attached to the arbor shaft. The second stage driven gear meshes with the second stage driving gear such that rotation of the second stage driving gear at the second rotational speed causes rotation of the second stage driven gear at the third rotational speed.

In yet another embodiment, the saw assembly further comprises a fastening mechanism configured to fix a saw blade to the arbor shaft.

The fastening mechanism may comprise a first flange washer configured to clamp against a first side of the saw blade and a second flange washer configured to clamp against a second side of the saw blade.

In still another embodiment of the saw assembly, the first flange washer has a first outer diameter, the second flange washer has a second outer diameter, and the second stage driven gear has a third outer diameter. The third outer diameter is less than at least one of the first outer diameter and the second outer diameter.

In some embodiments of the saw assembly, the power train assembly further comprising a power train housing in which the first and second gear stages are enclosed, the power train housing having an upper extent that is spaced apart from a central axis of the arbor shaft by a first distance that is less than a second distance by which an outer extent of at least one of the first and second flange washers is spaced apart from the central axis.

In some embodiments of the saw assembly, the motor output shaft, the intermediate shaft, and the arbor shaft are parallel to one another.

In one particular embodiment according to the disclosure, a method of operating a saw assembly of a table saw comprises rotating, with a motor of the saw assembly, a motor output shaft at a first rotational speed and transmitting, with a first gear stage, the rotation of the motor output shaft at the first rotational speed to rotation of an intermediate shaft at a second rotational speed. The method further includes transmitting, with a second gear stage, the rotation of the intermediate shaft at the second rotational speed to rotation of the arbor shaft at a third rotational speed. The second rotational speed is less than the first rotational speed and the third rotational speed is greater than the second rotational speed.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

As used herein, the phrase "approximately equal" is used to refer to all values that are within 10% of the largest referenced value. The terms "slightly less than" or "slightly greater than" are defined to include all values within 10% less than or 10% greater than, respectively, of the reference value. As used herein, the terms "substantially parallel" and "substantially perpendicular" refer to two elements that are between 0 and 15 degrees, inclusive, of being parallel or perpendicular, respectively, to one another.

Figure 1:
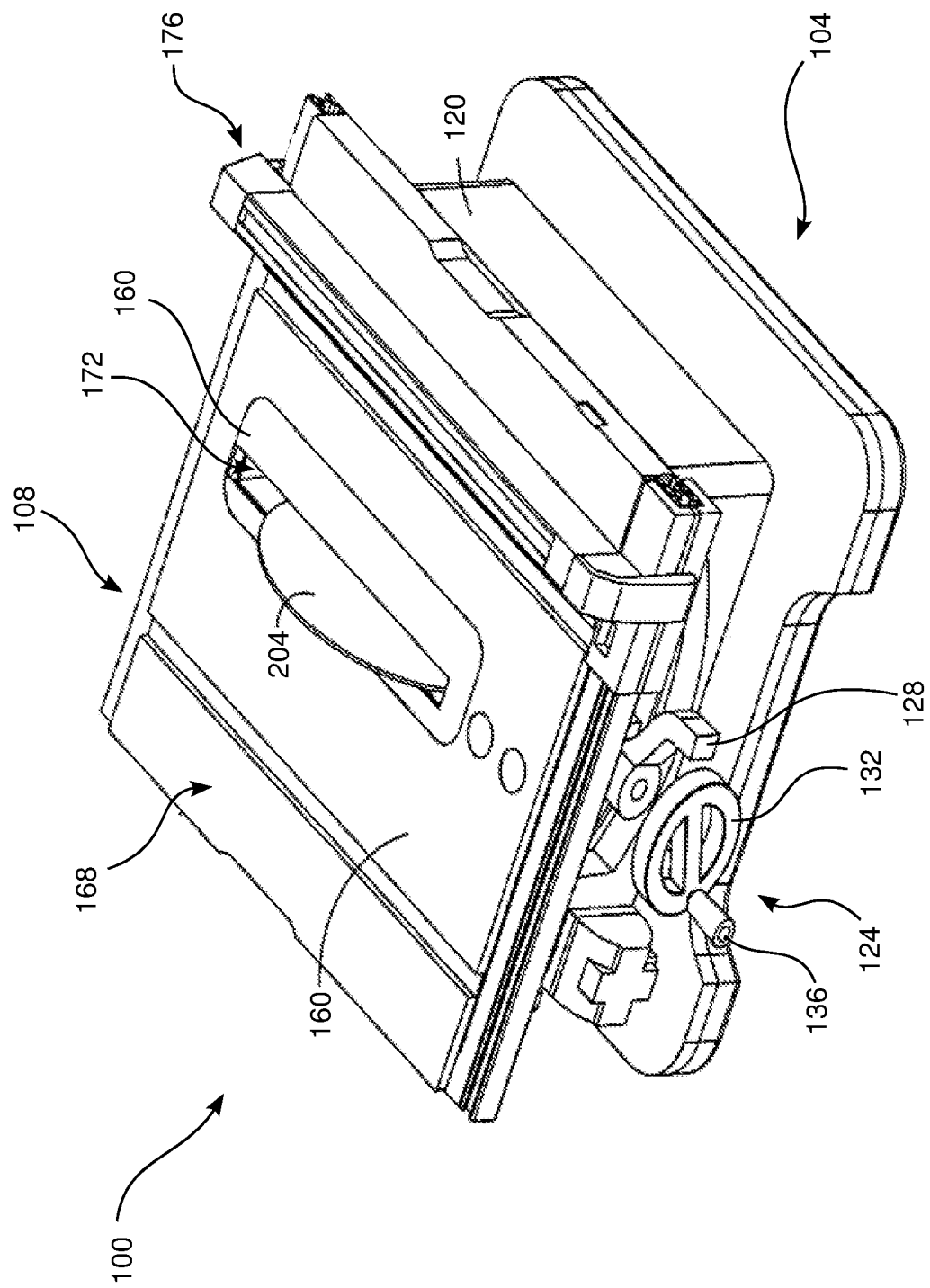
FIG. 1 is a front perspective view of a table saw having a dual stage power train assembly.
Figure 2:
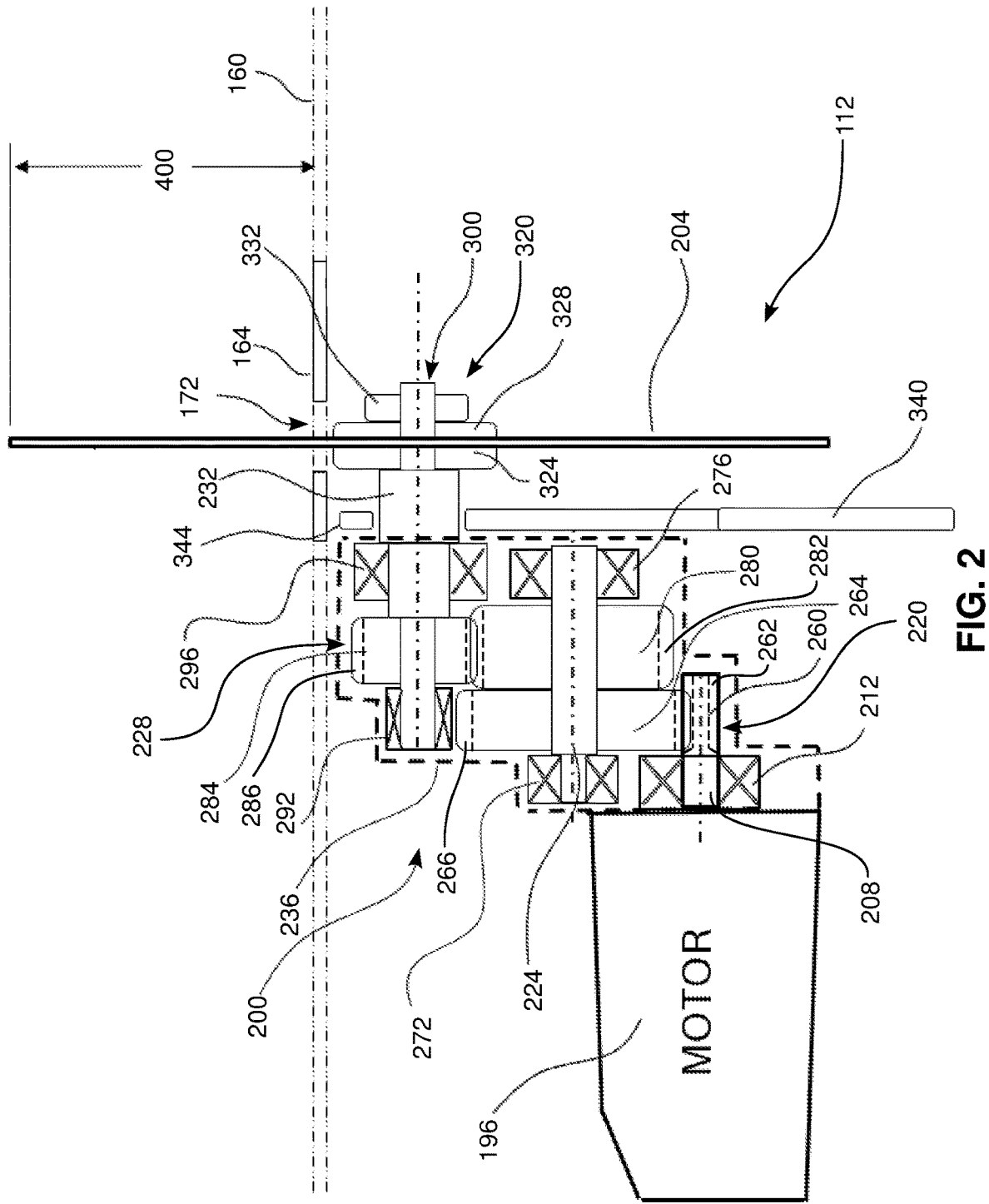
FIG. 2 is a schematic front view of the saw assembly of the table saw of FIG. 1 at a maximum blade height with no bevel.
Figure 3:
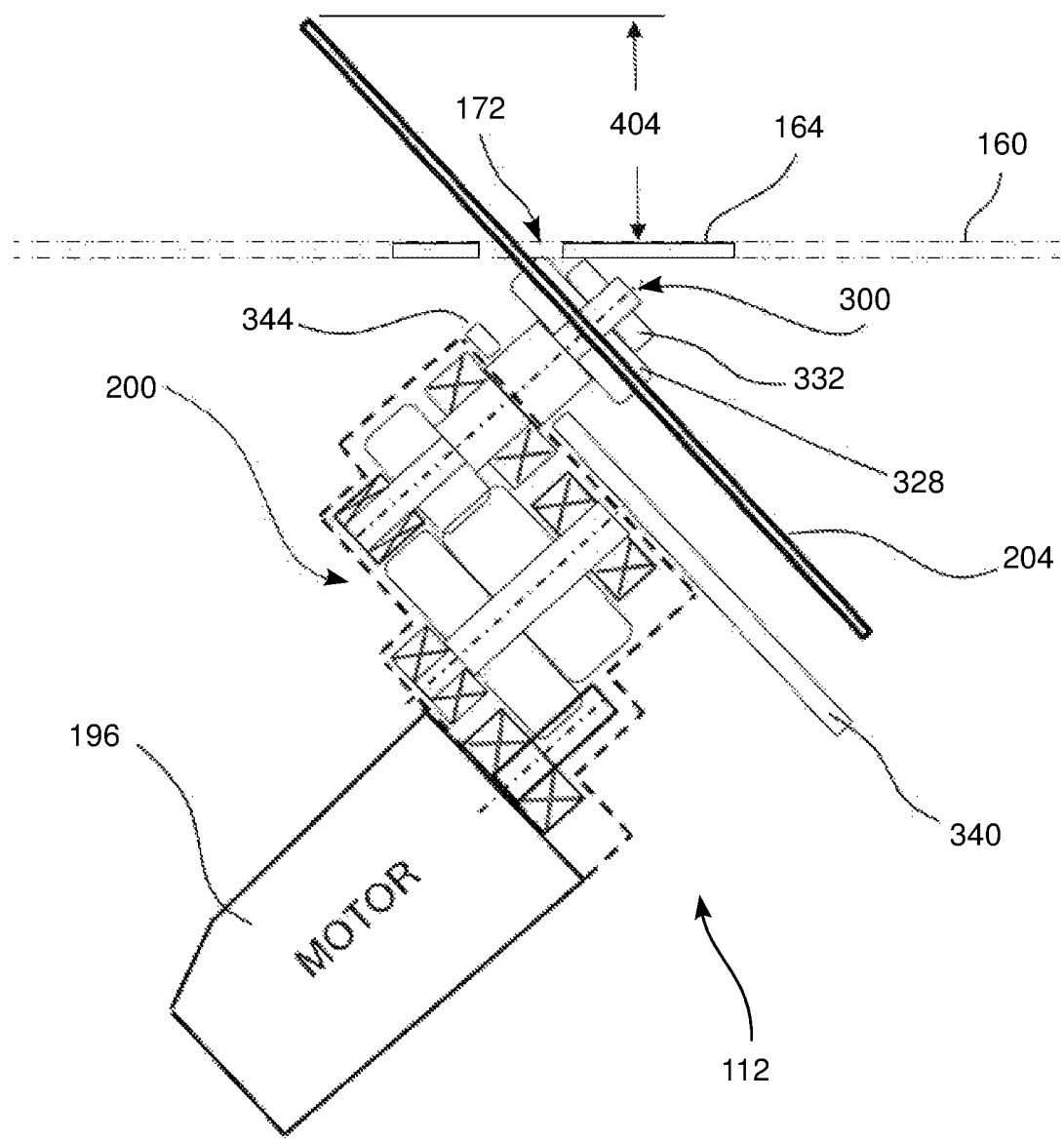
FIG. 3 is a schematic front view of the saw assembly of the table saw of FIG. 1 at a maximum blade height with a 45 degree bevel.

FIG. 1 illustrates a table saw 100 having an extension table system that provides extension of the cutting surface. The table saw 100 includes a base assembly 104, a table assembly 108, and a saw assembly 112 (FIGS. 2 and 3). The base assembly 104 is configured to support the table assembly 108 and the saw assembly 112. The base assembly 104 may include a frame structure or housing 120 enclosing the saw assembly 112, and one or more handles (not shown) that enable a user to easily transport the table saw 100.

In addition, the base assembly 104 includes an adjustment mechanism 124, which may include various actuators such as a bevel adjustment locking lever 128, a height adjustment wheel 132, and a height adjustment wheel handle 136. The adjustment mechanism 124 is configured such that turning the height adjustment wheel 132 causes the saw assembly 112 to move upwardly relative to the table top 160. Moving the height adjustment wheel 132 laterally, with the bevel adjustment locking lever 128 disengaged, causes the saw assembly 112 to rotate relative to the saw blade for a bevel cut (FIG. 3).

The table assembly 108 includes a table top 160 and a throat plate 164, which jointly define a support surface 168 configured to support a workpiece during cutting. The throat plate 164 defines a generally rectangular throat opening 172 through which a saw blade 204 extends. The table top 160 may also include a rip fence assembly 176 that is configured to provide support to the side of a workpiece during a rip cut.

Referring now to FIGS. 2 and 3, the saw assembly 112 includes a motor 196, a power train assembly 200, and a saw blade 204. When activated, the motor 196 rotates a motor output shaft 208, which is supported by a motor bearing 212. The motor output shaft 208 is operably connected to the saw blade 204 by the power train assembly 200 such that rotation of the output shaft 208 rotates the saw blade 204.

The power train assembly 200 includes a first gear stage 220, an intermediate shaft 224, a second gear stage 228, and an arbor shaft 232 (also referred to as a saw output shaft), all of which are at least partially enclosed in a gear housing 236. The first gear stage 220 includes a motor pinion gear 260 and a first stage driven gear 264. The motor pinion gear 260 is fixedly connected to the motor output shaft 208. In some embodiments, the motor pinion gear 260 is integrally formed with the motor output shaft 208, that is to say the motor pinion gear 260 is of one-piece monolithic construction with the motor output shaft 208, for example by being machined as one piece. In other embodiments, the motor pinion gear 260 is fixed to the motor output shaft 208 by, for example, a pressed connection, a pin connection, or another desired connection.

The motor pinion gear 260 has a plurality of gear teeth 262 that mesh with a plurality of gear teeth 266 of the first stage driven gear 264. As a result, rotation of the motor pinion gear 260 drives the first stage driven gear 264 to rotate. In one embodiment, the motor pinion gear 260 and the first stage driven gear 264 are both spur gears, in which the gear teeth project radially outwardly from the outside of the gear body and are aligned parallel to the rotational axis of the respective gear 260, 264. In another embodiment, the motor pinion gear 260 and the first stage driven gear 264 are both helical gears, in which the gear teeth project radially outwardly from the gear body and are angled relative to the rotational axis of the respective gear 260, 264. In some embodiments, the motor pinion gear 260 may have between 5 and 15 gear teeth 262, while the first stage driven gear 264 may have between 25 and 140 gear teeth 266.

The first stage driven gear 264 is fixedly connected to the intermediate shaft 224, which is supported by two intermediate shaft bearings 272, 276 so as to be rotatable within the two intermediate shaft bearings 272, 276. In some embodiments, the first stage driven gear 264 is integrally formed with the intermediate shaft 224, that is to say the first stage driven gear 264 is of one-piece monolithic construction with the intermediate shaft 224, for example by being machined as one piece. In other embodiments, the first stage driven gear 264 is fixed to the intermediate shaft 224 by, for example, a pressed connection, a pin connection, or another desired connection. The first stage driven gear 264 has a greater number of gear teeth than the motor pinion gear 260. Thus, as will be discussed in further detail below, the first gear stage 220 provides a speed reduction from the motor output shaft 208 to the intermediate shaft 224.

The second gear stage 228 includes a second stage driving gear 280, which has a plurality of gear teeth 282, and a second stage driven gear 284, which includes a plurality of gear teeth 286 that mesh with the gear teeth 282 of the second stage driving gear 280. As a result, rotation of the second stage driving gear 280 in one direction causes the second stage driven gear 284 to rotate in the opposite direction. In one embodiment, the second stage driving gear 280 and the second stage driven gear 284 are both spur gears. In another embodiment, the second stage driving gear 280 and the second stage driven gear 284 are both helical gears. In some embodiments, the second stage driving gear 280 may have between 20 and 120 gear teeth 282, while the second stage driven gear 284 may have between 10 and 50 gear teeth 286.

The second stage driving gear 280 is fixedly connected to the intermediate shaft 224. In some embodiments, the second stage driving gear 280 is integrally formed with the intermediate shaft 224, that is to say the second stage driving gear 280 is of one-piece monolithic construction with the intermediate shaft 224, for example by being cast as one piece. In other embodiments, the second stage driving gear 280 is fixed to the intermediate shaft 224 by, for example, a welded connection, a pin connection, or another desired connection.

The second stage driven gear 284 is fixedly connected to the arbor shaft 232 (also referred to herein as an output shaft), which is rotatably supported by two arbor shaft bearings 292, 296. As such, rotation of the second stage driven gear 284 in causes the arbor shaft 232 to rotate. In some embodiments, the second stage driven gear 284 is integrally formed with the arbor shaft 232, that is to say the second stage driven gear 284 is of one-piece monolithic construction with the arbor shaft 232, for example by being machined as one piece. In other embodiments, the second stage driven gear 284 is fixed to the arbor shaft 232 by, for example, a pressed connection, a pin connection, or another desired connection.

The number of gear teeth 286 of second stage driven gear 284 is less than the number of gear teeth 282 of the second stage driving gear 280. Therefore, as will be discussed in detail below, the second gear stage 228 provides a speed increase from the intermediate shaft 224 to the arbor shaft 232.

A portion of the motor output shaft 208, the first gear stage 220, the intermediate shaft 224, the second gear stage 228, a portion of the arbor shaft 232, and the associated bearings 212, 272, 276, 292, 296 are all housed within the gear housing 236. The gear housing 236 may be at least partially sealed to avoid dust and debris from interfering with the components of the power train assembly 200.

A threaded end 300 of the arbor shaft 232 projects out from the gear housing 236 so that the saw blade 204 can be mounted on the arbor shaft with a fastening mechanism 320. The fastening mechanism 320 includes an inner flange washer 324, an outer flange washer 328, and a nut 332. The inner flange washer 324 is interposed between the saw blade 204 and a portion of the arbor shaft 232. The nut 332 is threaded onto the threaded end 300 of the arbor shaft 232 so as to compress the outer flange washer 328 and the saw blade 204 against the inner flange washer 324, thereby fixing the saw blade 204 to the arbor shaft 232 so that the saw blade 204 rotates with the arbor shaft 232.

The saw assembly 112 is movably supported by an undercarriage 340, which may be, for example, an aluminum, steel, or plastic plate or enclosure. The undercarriage 340 is supported by the base assembly 104, and, in some embodiments, forms an enclosed volume in which at least a portion of the saw blade 204 is arranged. The undercarriage 340 is configured to pivot upon movement of the height adjustment wheel 132 so as to rotate the saw assembly 112 and bevel the saw blade 204.

In one embodiment, the undercarriage 340 includes an upper flange portion 344 that extends above the arbor shaft 232, and is separated from the central axis of the arbor shaft 232 by a distance that is less than the distance by which the inner and outer flange washers 324, 328 extend above the central axis of the arbor shaft 232. As a result, the upper flange 344 of the undercarriage 340 does not limit the highest position at which the saw assembly 112 can be positioned.

During operation of the saw, the motor 196 functions to rotate the motor output shaft 208, and thus the motor pinion gear 260, at a first speed. In one embodiment, the first speed may be between approximately 24,000 RPM and 30,000 RPM. Since the first stage driven gear 264 has a greater number of gear teeth than the motor pinion gear 260, the first gear stage 220 functions to transfer the rotational motion of the motor pinion gear 260 to the intermediate shaft 224 at a reduced speed. The speed reduction of the first gear stage 220 is based on the ratio of the number of teeth 266 ($G_1$) of the first stage driven gear 264 to the number of teeth 262 ($P_1$) of the motor pinion gear 260, which is referred to as the first stage gear ratio ($R_1$):

$$R_1 = \frac{G_1}{P_1}$$

In one embodiment, the first stage gear ratio may be between approximately 5.0 and approximately 20.0. The reduced speed of the intermediate shaft 224 may be between approximately 1,000 RPM and approximately 4,000 RPM.

Rotation of the intermediate shaft 224 also rotates the second stage driving gear 280, which also rotates the second stage driven gear 284 via the interaction between the respective gear teeth of the second stage gears 280, 284. Since the second stage driven gear 284 has a lesser number of gear teeth 286 than the second stage driven gear 280, the second stage driven gear 284, and connected arbor shaft 232, rotate at a faster speed than the intermediate shaft 224. The speed increase is based on the ratio of the number of teeth 286 ($G_2$) of the second stage driven gear 284 to the number of teeth 282 ($P_2$) of the second stage driving gear 280, which is referred to as the second stage gear ratio ($R_2$):

$$R_2 = \frac{G_2}{P_2}$$

Since the second gear stage 220 produces a speed increase, the second stage gear ratio is expressed as a gear reduction ratio of less than one. In one embodiment, the second stage gear ratio may be between approximately 0.2 and approximately 0.8. The speed of the arbor shaft 232 may be between approximately 3,500 RPM and approximately 5,000 RPM.

The overall gear ratio (G) of the power train assembly 200 is equal to the product of the first stage gear ratio ($R_1$) and the second stage gear ratio ($R_2$). In various embodiments, the overall gear ratio (G) may be between approximately 4.8 and 8.57. As such, a motor operating with an output speed of approximately 24,000 RPM to approximately 30,000 RPM is reduced to an arbor shaft speed of approximately 3,500 RPM to approximately 5,000 RPM.

Since the second stage driven gear 284 has a lesser number of teeth than the second stage driving gear 280, the second stage driven gear 284 has a smaller outer diameter than the second stage driving gear 280. As a result, the profile of the second stage driven gear 284 in the direction measured parallel to the cutting plane of the saw blade 204 is less than the profile of the second stage driving gear 280. Because of this, the distance the second stage driven gear 284 extends radially outwardly from the central axis of the arbor shaft 232 is less than in a conventional system in which the gear attached to the arbor shaft provides a speed reduction.

In particular, the system is configured such that the outer diameter of the second stage driven gear 284 is less than the outer diameter of one or both of the inner and outer flange washers 324, 328. In addition, since the undercarriage upper flange portion 344 also does not extend higher than the inner and outer flange washers 324, 328, the maximum distance 400 by which the saw blade 204 can be positioned above the table top 160 for an unbeveled cut is limited by the diameter of the inner and outer flange washers 324, 328, not by the size of the power train assembly 200.

In some applications, the diameter of the inner and outer flange washers 324, 328 are specified by a standards setting organization, for example the Underwriters Lab ("UL"). In particular, the diameter of the inner and outer flange washers 324, 328 may be specified by IEC/EN/UL 62841-3-1 standards, which provides minimum inner and outer flange washer diameters that are based on the diameter of the saw blade for which the table saw is designed. Thus, since the maximum height 400 of the saw blade 204 for the disclosed power train assembly 200 is limited by the diameter of the inner and outer flange washers, which cannot be reduced while maintaining compliance with UL standards, the disclosed power train assembly 200 may provide the maximum possible unbeveled blade height 400 for a saw that complies with UL standards.

FIG. 3 illustrates the saw assembly 112 in a 45-degree bevel position in the highest position. In the beveled position, the saw blade 204 extends through the throat plate opening 172 at an angle of 45 degrees with respect to the table top 160 and throat plate 164. In the 45 degree beveled position, the outer flange washer 328 extends partially into the throat opening 172, above the bottom surface of the throat plate 164. Thus, in the illustrated embodiment, the height 404 of the saw blade 204 above the table top 160 in the 45 degree beveled position is limited by the size of the nut 332, as the saw assembly 112 cannot be positioned such that the nut 332 contacts the lower surface of the throat plate 164. In some embodiments, the maximum beveled blade height 404 may be based on the position at which the outer surface of the outer flange washer 328 would contact the corner of the throat plate 164 at the throat plate opening 172.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

What is claimed is:

1. A method of operating a saw assembly of a table saw comprising:
   rotating, with a motor of the saw assembly, a motor output shaft at a first rotational speed;
   transmitting, with a first gear stage, the rotation of the motor output shaft at the first rotational speed to rotation of an intermediate shaft at a second rotational speed, the second rotational speed being less than the first rotational speed and the intermediate shaft being substantially parallel to the motor output shaft; and
   transmitting, with a second gear stage, the rotation of the intermediate shaft at the second rotational speed to rotation of an arbor shaft at a third rotational speed, the third rotational speed being greater than the second rotational speed, the arbor shaft being substantially parallel to the intermediate shaft, the saw assembly is adjustably supported by a frame structure or housing of a base assembly of the table saw and is arranged beneath a table assembly of the table saw in such a way that in operation a saw blade attached to the arbor shaft extends upwardly through the table assembly, the table assembly mounted to the frame structure or the housing.

2. A table saw, comprising:
   a base assembly having a frame structure or housing;
   a table assembly mounted to the frame structure or housing; and
   a saw assembly adjustably supported by the frame structure or housing and arranged beneath the table assembly, the saw assembly comprising:

a motor having a motor output shaft, the motor configured to rotate the motor output shaft at a first rotational speed; and
a power train assembly comprising:
an intermediate shaft;
a first gear stage configured to transmit rotation of the motor output shaft at the first rotational speed to rotation of the intermediate shaft at a second rotational speed, the second rotational speed being less than the first rotational speed;
an arbor shaft; and
a second gear stage configured to transmit rotation of the intermediate shaft at the second rotational speed to rotation of the arbor shaft at a third rotational speed, the third rotational speed being greater than the second rotational speed,
wherein the motor output shaft, the intermediate shaft, and the arbor shaft are substantially parallel to one another.

3. The table saw of claim 2, the first gear stage further comprising:
a motor pinion gear fixedly attached to the motor output shaft; and
a first stage driven gear fixedly attached to the intermediate shaft, the first stage driven gear meshing with the motor pinion gear such that rotation of the motor pinion gear at the first rotational speed causes rotation of the first stage driven gear at the second rotational speed.

4. The table saw of claim 3, the second gear stage further comprising:
a second stage driving gear fixedly attached to the intermediate shaft; and
a second stage driven gear fixedly attached to the arbor shaft, the second stage driven gear meshing with the second stage driving gear such that rotation of the second stage driving gear at the second rotational speed causes rotation of the second stage driven gear at the third rotational speed.

5. The table saw of claim 4, the saw assembly further comprising a fastening mechanism configured to fix a saw blade to the arbor shaft.

6. The table saw of claim 5, the fastening mechanism comprising:
a first flange washer configured to clamp against a first side of the saw blade; and
a second flange washer configured to clamp against a second side of the saw blade.

7. The table saw of claim 6, wherein the first flange washer has a first outer diameter, the second flange washer has a second outer diameter, and the second stage driven gear has a third outer diameter, the third outer diameter being less than at least one of the first outer diameter and the second outer diameter.

8. The table saw of claim 7, the power train assembly further comprising a power train housing in which the first and second gear stages are enclosed, the power train housing having an upper extent that is spaced apart from a central axis of the arbor shaft by a first distance that is less than a second distance by which an outer extent of at least one of the first and second flange washers is spaced apart from the central axis.

9. The table saw of claim 6, wherein the base assembly includes an adjustment mechanism operably connected to the saw assembly and configured to raise and lower the saw assembly relative to the table assembly and the frame structure or housing.

10. The table saw of claim 9, wherein the table assembly comprises:
a table top; and
a throat plate defining a throat opening through which the saw blade extends,
wherein the adjustment mechanism is further configured to rotate the saw assembly relative to the table top, and
wherein, when a cutting plane of the saw assembly is at an angle of 45 degrees relative to the table top, one of the first and second flange washers extends at least partially into the throat opening.

11. A saw assembly for a table saw, which includes a base assembly having a frame structure or housing and a table assembly mounted on the frame structure or housing, comprising:
a motor having a motor output shaft, the motor configured to rotate the motor output shaft at a first rotational speed; and
a power train assembly comprising:
an intermediate shaft;
a first gear stage configured to transmit rotation of the motor output shaft at the first rotational speed to rotation of the intermediate shaft at a second rotational speed, the second rotational speed being less than the first rotational speed;
an arbor shaft; and
a second gear stage configured to transmit rotation of the intermediate shaft at the second rotational speed to rotation of the arbor shaft at a third rotational speed, the third rotational speed being greater than the second rotational speed,
wherein the saw assembly is configured to be adjustably supported by the frame structure or housing and to mount beneath the table assembly of the table saw in such a way that in operation a saw blade attached to the arbor shaft extends upwardly through the table assembly, and
wherein the motor output shaft, the intermediate shaft, and the arbor shaft are substantially parallel to one another.

12. The saw assembly of claim 11, the first gear stage further comprising:
a motor pinion gear fixedly attached to the motor output shaft; and
a first stage driven gear fixedly attached to the intermediate shaft, the first stage driven gear meshing with the motor pinion gear such that rotation of the motor pinion gear at the first rotational speed causes rotation of the first stage driven gear at the second rotational speed.

13. The saw assembly of claim 12, the second gear stage further comprising:
a second stage driving gear fixedly attached to the intermediate shaft; and
a second stage driven gear fixedly attached to the arbor shaft, the second stage driven gear meshing with the second stage driving gear such that rotation of the second stage driving gear at the second rotational speed causes rotation of the second stage driven gear at the third rotational speed.

14. The saw assembly of claim 13, further comprising a fastening mechanism configured to fix a saw blade to the arbor shaft.

15. The saw assembly of claim 14, the fastening mechanism comprising:
a first flange washer configured to clamp against a first side of the saw blade; and a second flange washer configured to clamp against a second side of the saw blade.

16. The saw assembly of claim 15, wherein the first flange washer has a first outer diameter, the second flange washer has a second outer diameter, and the second stage driven gear has a third outer diameter, the third outer diameter being less than at least one of the first outer diameter and the second outer diameter.

17. The saw assembly of claim 16, the power train assembly further comprising a power train housing in which the first and second gear stages are enclosed, the power train housing having an upper extent that is spaced apart from a central axis of the arbor shaft by a first distance that is less than a second distance by which an outer extent of at least one of the first and second flange washers is spaced apart from the central axis.

* * * * *

UNITED STATES PATENT AND TRADEMARK OFFICE
CERTIFICATE OF CORRECTION

| | | |
|---|---|---|
| PATENT NO. | : 10,549,364 B2 | Page 1 of 1 |
| APPLICATION NO. | : 15/898962 | |
| DATED | : February 4, 2020 | |
| INVENTOR(S) | : Andrew Frolov | |

It is certified that error appears in the above-identified patent and that said Letters Patent is hereby corrected as shown below:

On the Title Page

Item [54] and in the Specification, Column 1 Line 1 insert the word --Stage-- between the words "Dual" and "Power".

Signed and Sealed this
Twenty-eighth Day of April, 2020

Andrei Iancu
*Director of the United States Patent and Trademark Office*